(12) United States Patent
Xian et al.

(10) Patent No.: US 12,513,651 B2
(45) Date of Patent: Dec. 30, 2025

(54) NODE POSITIONING METHOD FOR MARINE ENVIRONMENTAL MONITORING WIRELESS SENSOR NETWORKS

(71) Applicant: Shanghai Maritime University, Shanghai (CN)

(72) Inventors: Jiangfeng Xian, Shanghai (CN); Junling Ma, Shanghai (CN); Huafeng Wu, Shanghai (CN); Yongsheng Yang, Shanghai (CN); Xiaojun Mei, Shanghai (CN); Xinqiang Chen, Shanghai (CN); Chaofeng Li, Shanghai (CN); Qiannan Zhang, Shanghai (CN); Linian Liang, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 349 days.

(21) Appl. No.: 18/365,323

(22) Filed: Aug. 4, 2023

(65) Prior Publication Data

US 2024/0422714 A1  Dec. 19, 2024

(30) Foreign Application Priority Data

Jun. 19, 2023 (CN) .......................... 202310724196.8

(51) Int. Cl.
*H04W 64/00* (2009.01)
*G01S 11/06* (2006.01)
*H04B 17/318* (2015.01)
*H04W 84/18* (2009.01)

(52) U.S. Cl.
CPC ............. *H04W 64/00* (2013.01); *G01S 11/06* (2013.01); *H04B 17/318* (2015.01); *H04W 84/18* (2013.01)

(58) Field of Classification Search
CPC ....... H04W 64/00; H04W 84/18; H04W 4/38; H04W 4/023; H04W 4/025; G01S 11/06; H04B 17/318; Y02D 30/70
USPC ...................................................... 455/456.1
See application file for complete search history.

(56) References Cited

U.S. PATENT DOCUMENTS

| | | | |
|---|---|---|---|
| 2013/0155809 A1* | 6/2013 | L'Her | G01S 11/14 367/19 |
| 2019/0250244 A1* | 8/2019 | Ji | G01S 5/18 |
| 2024/0007197 A1* | 1/2024 | Kong | H04B 10/80 |

* cited by examiner

*Primary Examiner* — Huy C Ho

(74) *Attorney, Agent, or Firm* — Kilpatrick Townsend & Stockton LLP

(57) ABSTRACT

A node positioning method for marine environmental monitoring wireless sensor networks is provided, which jointly estimates node positions and path loss factors by considering the node real-time movement and the path loss and absorption effect of underwater communication; transforms an original non-convex problem into a non-negative constrained least squares framework, and finds the optimal solution of marine node positions by two stages of interior point method and block coordinate update. In the first stage, the problem is re-expressed by using the penalty function according to the interior point method to obtain the approximate solution; and in the second stage, the original problem is transformed into a generalized trust region sub-problem, and the approximate solution obtained by the interior point method is used as the initial estimation, the accurate estimation values of the marine node position and path loss factor are obtained by iterative solutions combined with the block coordinate update.

10 Claims, 6 Drawing Sheets

NODE POSITIONING METHOD FOR MARINE ENVIRONMENTAL MONITORING WIRELESS SENSOR NETWORKS

CROSS-REFERENCE TO RELATED APPLICATIONS

This application claims priority to Chinese Patent Application No. 202310724196.8, filed on Jun. 19, 2023, the contents of which are hereby incorporated by reference for all purposes.

TECHNICAL FIELD

The application relates to a technical field of marine wireless sensor network node localization, and in particular to a high-precision and high-robustness positioning method for marine environmental monitoring wireless sensor networks.

BACKGROUND

In recent years, the marine environment is continuously deteriorated and marine resources are in shortage increasingly, it has brought great challenges to monitoring and managing the marine environment, and the effective monitoring and management of the marine environment has become particularly important. Marine environmental monitoring wireless sensor networks (MEM-WSNs), as a new marine monitoring technology, has a broad application prospect in marine science and resource management. However, the monitoring of the marine environment depends on monitoring data collected in accurate node coordinates, and the lack of position data makes the collected monitoring data meaningless. Therefore, obtaining accurate position information of marine nodes is the basis and guarantee to realize marine environmental monitoring. MEM-WSNs includes anchor nodes deployed on the sea surface and unknown nodes deployed underwater. Among them, the known position information of the anchor nodes is obtained through the built-in GPS or Beidou positioning module; however, the position information of unknown underwater nodes needs to be obtained indirectly, that is, the received signal strength indication (RSSI) and other data information are exchanged with the anchor nodes through an underwater acoustic communication to calculate their own position coordinates.

MEM-WSNs nodes mainly rely on underwater acoustic channels to communicate underwater, which has unique technical characteristics and difficulties: first, the attenuation of the underwater acoustic channels increases with the frequency index of acoustic waves, resulting in narrow bandwidth, low communication rates and short transmission distances of the underwater acoustic communication: second, in the marine environment, a signal transmission not only has attenuation loss, but also has absorption loss, which have a great impact on the positioning accuracy: in addition, the stress mode of nodes is complex, and the inherent dynamic characteristics in the ocean, such as vortex, internal wave and thermocline, lead to great uncertainty in the motion mode of nodes, that is, the topological structure of the network is highly dynamic, which makes it difficult to accurately locate MEM-WSNs nodes.

China patent application CN113242512A discloses a node positioning scheme using the method of sound ray compensations to correct the ranging between ordinary nodes and anchor nodes, introduces the crossover in the genetic algorithm, and embeds the crossover into the particle swarm algorithm to obtain a node position scheme for the optimal position of particles and particle swarms. China patent application CN115038165A discloses a target position estimation method for constructing a ranging model of received signal strength based on Snell's law and a ray tracing theorem according to the layered propagation effect of acoustic signals underwater. China patent application CN104302001A discloses a scheme in which each node updates its own movement mode according to the water flow movement to predict the future position of the node.

For the positioning of MEM-WSNs nodes, the existing positioning methods all have at least one of the following defects: 1) assuming that the path loss factor is known, in the application of MEM-WSNs, the path loss factor is unknown and changes in real time with the dynamic change of the marine environment: 2) the scenario that all nodes move in real time is not considered; and 3) the attenuation loss and the absorption effect of the signal transmission in the underwater environment are not considered. Therefore, it is necessary to propose a new node positioning method to realize a node positioning with high-precision and high-robustness for MEM-WSNs.

SUMMARY

In order to solve the problem of low positioning accuracy caused by the highly dynamic underwater environment and the underwater absorption effect of acoustic communication, a high-precision and high-robustness positioning method for marine environmental monitoring wireless sensor networks (MEM-WSNs) is provided in the application.

The purpose of the application may be achieved by following a technical scheme:
  a node positioning method for MEM-WSNs, including following steps:
  establishing a received signal strength model according to a signal propagation loss and an underwater sound propagation absorption effect;
  establishing an optimization function by a joint estimation of a path loss factor and a target position;
  re-expressing the optimization function by using a penalty function, and finding an approximate solution of position coordinates of marine nodes by using an interior point method; and
  transforming an original positioning problem into a generalized trust region sub-problem, and using the approximate solution found by the interior point method as an initial estimated value of the generalized trust region sub-problem, and finding an optimal solution by combining a block coordinate update.

Further, specific steps of establishing the received signal strength model specifically include:
  according to a wireless signal loss propagation model, a signal strength of information sent by a node received by node i is expressed as:

$$L_i^t = L_s^t - L(d_0) - 10\beta \log_{10} \frac{\|x^t - a_i^t\|}{l_0} - \alpha_f \|x^t - a_i^t\| + n_i$$

where $L_i^t$, represents a power of a target node received by an $i^{th}$ anchor node at a moment t; $L_s^t$, represents a transmit power of the target node at the moment t; $L(l_0)$ represents a loss value when a reference distance is $l_0$: $\beta$ represents the path loss factor: $\|\Box\|$ represents a second-order norm: $n_i$ represents a signal attenuation noise of the $i^{th}$ anchor node; $\alpha_f$ represents an absorption coefficient: $a_i^t$ represents a position of the $i^{th}$ anchor node at the moment t; and $x^t$ represents a position of the target node at the moment t.

Further, the joint estimation of the path loss factor and the target position is as follows:

$$F(\hat{x}^t, \beta) = \arg\min_{x^t, \beta} \sum_{i=1}^{M} \frac{\left(L_i^t - L_0 + 10\beta\log_{10}\frac{l_i^t}{l_0} + c_i^t\right)}{2\sigma_i^2}$$

where $x^t$ represents the position of the target node at the moment t; $\beta$ represents the path loss factor; $L_i^t$ represents the power of the target node received by the $i^{th}$ anchor node at the moment t; $L_0 = L_s^t - L(l_0)$; $L_s^t$ represents the transmit power of the target node at the moment t; $L(l_0)$ represents the loss value when the reference distance is $l_0$; $l_i^t = \|x^t - a_i^t\|$; $c_i^t = \alpha_f l_i^t$; $a_i^t$ represents the position of the $i^{th}$ anchor node at the moment t; and $\alpha_f$ represents the absorption coefficient.

Further, the optimization function by the joint estimation of the path loss factor and the target position is expressed as a following adaptive non-linear sampling (ANLS) problem:

$$F(\psi) = \arg\min_{\psi\ldots 0}\|A\psi - B\|^2$$

where $A = \begin{bmatrix} 1 & -2(a_1^t)^T & \mu_1 & \ln\mu_1 \\ \vdots & \vdots & & \vdots \\ 1 & -2(a_N^t)^T & \mu_N & \ln\mu_N \end{bmatrix}^T$, $$B = \begin{bmatrix} \mu_1 - \|a_1^t\|^2 \\ \vdots \\ \mu_N - \|a_N^t\|^2 \end{bmatrix}; \psi = \left[\|x^t\|^2, (x^T)^T, \vartheta\right]^T;$$

$a_i^t$ represents the position of the $i^{th}$ anchor node at the moment t; $x^t$ represents the position of the target node at the moment $$t; \vartheta = \frac{\beta - \tilde{\beta}}{\tilde{\beta}};$$

$\beta$ represents the path loss factor; $\tilde{\beta}$ represents an estimated parameter;

$$\beta = \tilde{\beta}\left(1 + \frac{\beta - \tilde{\beta}}{\tilde{\beta}}\right);$$

and $\mu_i = 10^{(L_0 - L_i^t + \alpha_6\rho)/5}\tilde{\beta}$.

Further, specific steps of re-expressing the optimization function by using the penalty function and finding the approximate solution by using the interior point method include:

according to the interior point method, introducing the penalty function to re-describe the problem:

$$\Phi(\psi, \theta) = \min\left(\|A\psi - B\|^2 - \theta\sum_{i=1}^{N}\ln(\psi_i)\right)$$

where $\theta>0$ represents a penalty factor, $\theta$ gradually decreases to zero with iterations, and a feasible region is $D = \{\psi_i > 0, i=1, 2, \ldots, k\}$;

solving Karush-Kuhn-Tucker (KKT) by using Newton iteration method to find the optimal solution of the problem.

Further, specific steps of solving KKT by Newton iteration method to find the optimal solution of the problem include:

making $z_k = (\psi_k)^{-1}$, $Z = \text{diag}(z_1, z_2, \ldots, z_k)$, then expressing KKT conditions as:

$$\psi^T(A^T A\psi - A^T B) - z = 0,$$
$$YZE - \theta E = 0$$

writing the KKT conditions in a matrix form:

$$F(\psi, z) = \begin{bmatrix} \psi^T(A^T A\psi - A^T B) - z \\ YZE - \theta E \end{bmatrix} = 0$$

according to $F(\psi_k, z_k) + F'(\psi_k, z_k)(d_\psi^k, d_z^k) = 0$, building a linear system:

$$\begin{bmatrix} \nabla\Phi_{yy}^2(\psi, 0) & -I \\ Z_k & Y_k \end{bmatrix}\begin{bmatrix} d_k^\psi \\ d_k^z \end{bmatrix} = -\begin{bmatrix} \nabla f(y_k) - z_k \\ Y_k Z_k E - \theta_j E \end{bmatrix},$$

where $d_k^\psi$ and $d_k^z$ represent Newton iteration directions;

finding an initial point that satisfying the system, and searching linearly along $d_k^\psi$ and $d_k^z$ respectively to find new iterative values; when tolerances of all conditions are established, a final solution $\psi^*$ is obtained.

Further, specific steps of transforming the original positioning problem into the generalized trust region sub-problem include:

$$F(\psi) = \arg\min_{\psi\ldots 0}\|\varpi_i(A\psi - B)\|^2$$
$$\text{s.t. } (\psi)^T D\psi + 2 f^T \psi = 0$$

where $\varpi_i = 1 - l_i^t/\sum_{i=1}^{N} l_i^t$, $D = \begin{bmatrix} 0 & 0_{1\times 4} & 0 \\ 0 & I_4 & 0 \\ 0 & 0_{1\times 4} & 0 \end{bmatrix}$, $f = \begin{bmatrix} -\frac{1}{2} \\ 0_{4\times 1} \end{bmatrix}$;

I and 0 represent respectively an identity matrix and a zero matrix;

introducing a regularization function $h(\varpi_i)$:

$$G(\psi, \varpi) = \arg\min_{\psi\ldots}\|\varpi_i(A\psi - B)\|^2 + h(\varpi_i)$$
$$\text{s.t. } (\psi)^T D\psi + 2 f^t \psi = 0$$
$$h(\varpi_i) = \sum_{i=1}^{N}\delta^2\varpi_i + \frac{2-\rho}{\rho}\varpi_i^{-\frac{\rho}{2-\rho}}.$$

Further, transforming the original positioning problem into two sub-problems:

$$\begin{cases} \psi^{k+1} = \arg\min_{\psi} G(\psi, \varpi^k) \\ \text{s.t. } (\psi)^T D\psi + 2\ f^t\psi = 0 \end{cases}$$

$$\begin{cases} \varpi^{k+1} = \arg\min_{\omega} G(\psi^{k+1}, \varpi) \\ \text{s.t. } (\psi)^T D\psi + 2\ f^t\psi = 0 \end{cases}$$

where k represents a number of the iterations;

a first sub-problem is a non-convex function, solved by constructing a block coordinate updating equation based on Lipschitz constant; and a second sub-problem is a strictly convex function, solved in each iteration according to a following formula:

$$\varpi_i^k = (A\psi - B)^2 + \delta^2)^{\frac{p-2}{p}}.$$

Further, specific steps of solving the first sub-problem by constructing the block coordinate updating equation based on Lipschitz constant include.

$$\psi^{k+1} = \arg\min_{\psi}\left\{\nabla_{\psi}G(\hat{\psi}, \varpi^k), \varpi^{k-1}, \psi - \hat{\psi}^k\right\} + \lambda^k\left\|\psi - \hat{\psi}^k\right\|^2$$

$$s.t.\ (\psi)^T D\psi + 2\ f^t\psi = 0$$

where $\hat{\psi}^k = \psi^{k-1} + {}^k(\psi^{k-1} - \psi^{k-2}), \eta^k = \frac{1}{12}\sqrt{\lambda^{k-1}/\lambda^k}$ is a given extrapolation coefficient, $\lambda^0 = 2\|k^T\overline{\omega}k\|$;

introducing a multiplier $\wp \in \square$, there is a global minimum when the KKT condition is obeyed $$(\lambda^k I_3 + \wp D)\psi^k = -\kappa^T\varpi^{k-1}\left(A\hat{\psi}^k - B\right) + \lambda^k\hat{\psi}^k - \wp f,$$

$$(\psi)^T D\psi + 2\ f^t\psi 3'0,$$

$$\wp \ldots \max\left(-l^k, \left(\sqrt{(A^T A)D^2(A^T A)}\right)^{-1}\right)$$

obtaining the optimal solution by a following formula:

$$\psi(\wp) = (\lambda^k I_3 + \wp^* D)^{-1} \times \left(-A^T\varpi^{k-1}\left(A\hat{\psi}^k - B\right) + \lambda^k\hat{\psi}^k - \wp^* f\right)$$

where obtaining $\wp$, $\wp^*$ by following formulas:

$$\wp^{\mathring{a}} = \max\left[-\text{diag}(\lambda^k)/\text{diag}(D), \wp\right],$$

$$\psi(\wp)^T D\psi(\wp) + 2\ f^T\psi(\wp) = 0$$

calculating the precise position coordinate $x^t$ of the marine node and the estimated value $\beta = \tilde{\beta}(1+\vartheta)$ of the path loss factor after a variable $\psi$ is obtained, where $\vartheta$ is the first column of the last row of $\psi$.

Further, in order to further optimize the estimated value of the path loss factor, calculating an average value of the path loss factor according to the solved position information:

$$\bar{\beta} = \frac{\sum_{i=1}^{N}\left(L_0 - L_i - \alpha_f \hat{l}_i^t\right)}{\sum_{i=1}^{N}\left(10\log_{10}\hat{l}_i^t\right)}$$

where $\hat{l}_i^t$ represents an estimated value of a distance between an estimated position of an unknown node and the anchor node.

Compared with the prior art, the application has following beneficial effects:

the positioning method provided by the application is suitable for a highly dynamic marine environment, and may jointly estimate the node positions and the path loss factor. The real-time movement of all nodes, the path loss and the absorption effect of the underwater communication are considered, which is in line with the real situation when using wireless sensor networks to monitor the marine environment. A positioning method based on the interior point method and the block coordinate update is proposed to jointly estimate the position of marine nodes and the path loss factor, and the positioning with high-precision and high-robustness for ocean target nodes is realized.

DETAILED DESCRIPTION OF THE EMBODIMENTS

The present application is described in detail with the drawings and specific embodiments. This embodiment is implemented on the premise of the technical scheme of the present application, and the detailed implementation and specific operation process are given, but the protection scope of the present application is not limited to the following embodiments.

Embodiment 1

In order to solve the problem of low positioning accuracy caused by the highly dynamic underwater environment and the underwater absorption effect of acoustic communication, a high-precision and high-robustness positioning method for marine environmental monitoring wireless sensor networks (MEM-WSNs) is provided in the application. This method is suitable for the accurate position of underwater three-dimensional spatial nodes with an unknown path loss factor, and effectively improves the positioning accuracy of MEM-WSNs nodes.

Figure 1:
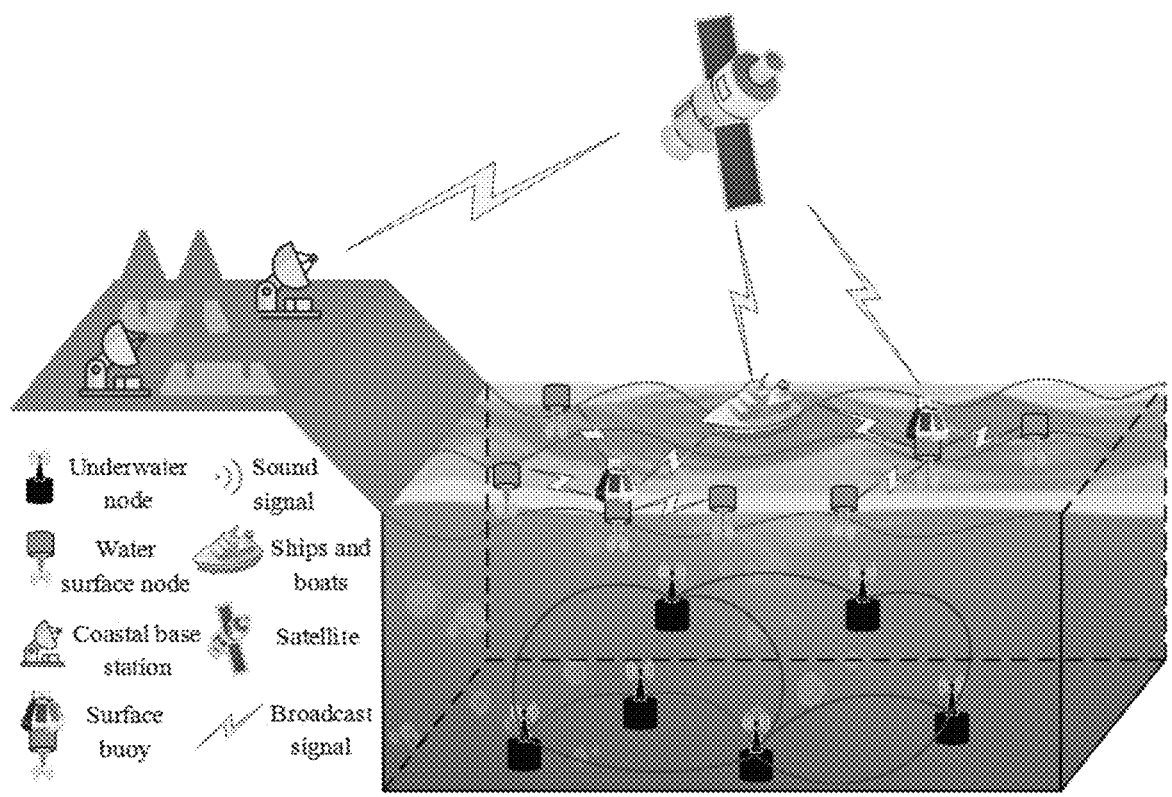
FIG. 1 is a model diagram of a system for marine environmental monitoring wireless sensor networks (MEM-WSNs).

The application is suitable for underwater node positioning requirements in the marine ecological environment, and the scenario is shown in FIG. 1.

Figure 2:
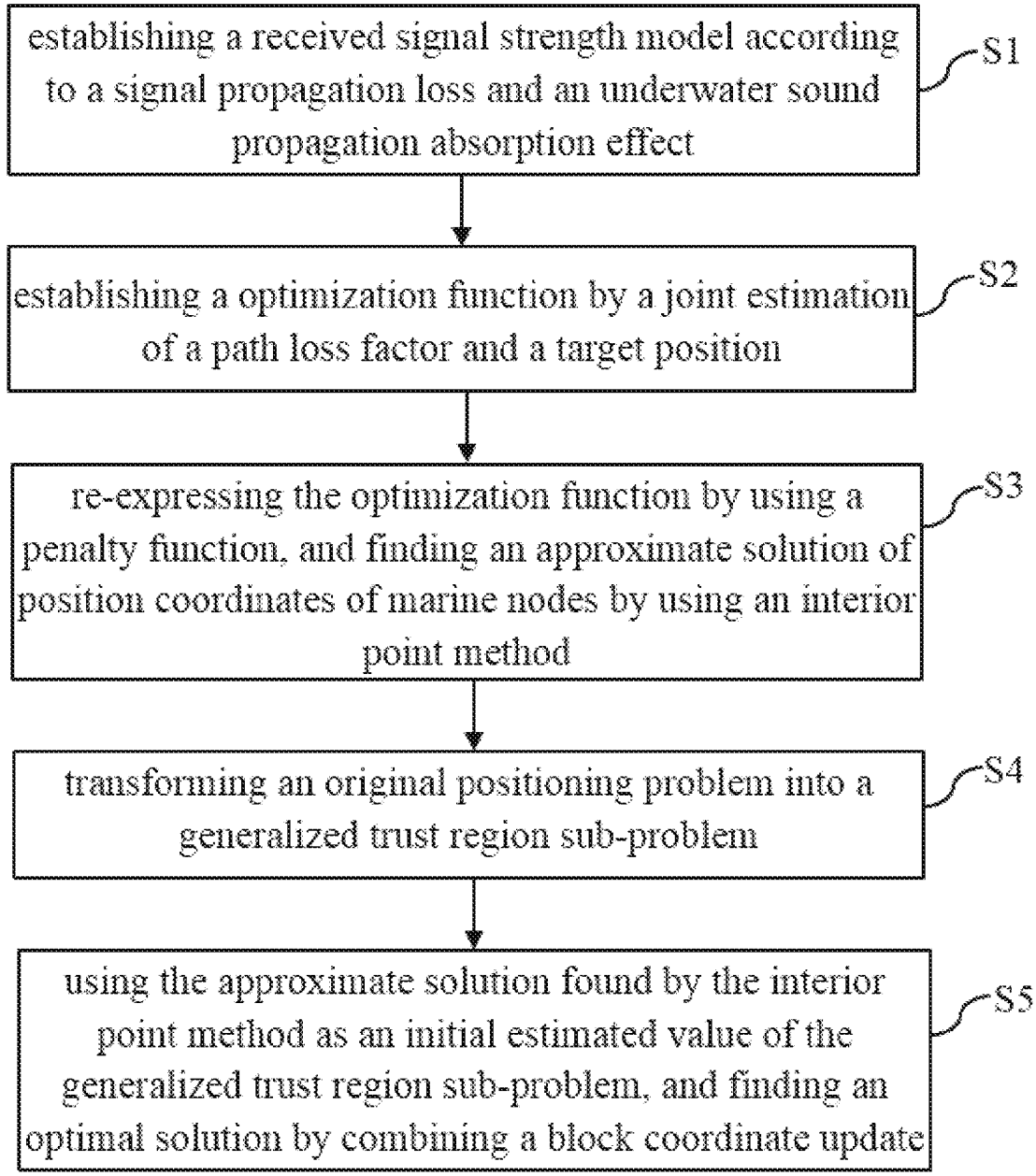
FIG. 2 is a flowchart of a node positioning method for marine environmental monitoring wireless sensor network node according to the present application.

As shown in FIG. 2, on the basis of comprehensively considering the complexity and the particularity of underwater target nodes for marine environmental monitoring, and aiming at the characteristics of node positioning of underwater wireless sensor networks, the application discloses a node positioning method for MEM-WSNs, which introduces an estimated parameter to jointly estimate the node position and the environmental path loss factor. The method includes two stages. Firstly, an original non-convex problem is transformed into a non-negative constrained least squares framework, and a two-stage method based on an interior point method (IPM) and a block coordinate update (BCU) is proposed to find the optimal solution of the marine node position. In the first stage, the penalty function is used to re-express the problem and find the approximate solution according to the IPM. In the second stage, the original problem is transformed into a generalized trust region sub-problem (GTRS), and the approximate solution obtained by the IPM is used as the initial estimation in the second stage, then, by combining with the BCU, the accurate estimation values of the marine node position and of the path loss factor are obtained. The node positioning method for MEM-WSNs proposed by the application includes following steps:

S1, establishing a received signal strength model according to a signal propagation loss and an underwater sound propagation absorption effect;

S2, constructing an optimization function by a joint estimation of a path loss factor and a target position through approximate operations such as Taylor expansion;

S3, re-expressing the optimization function by using the penalty function, and finding an approximate solution by using the IPM;

S4, transforming the original problem into the GTRS sub-problem; and

S5, taking the approximate solution found by the IPM as the initial estimation value of the GTRS sub-problem, and combining with the BCU to find the optimal solution.

Figure 3:
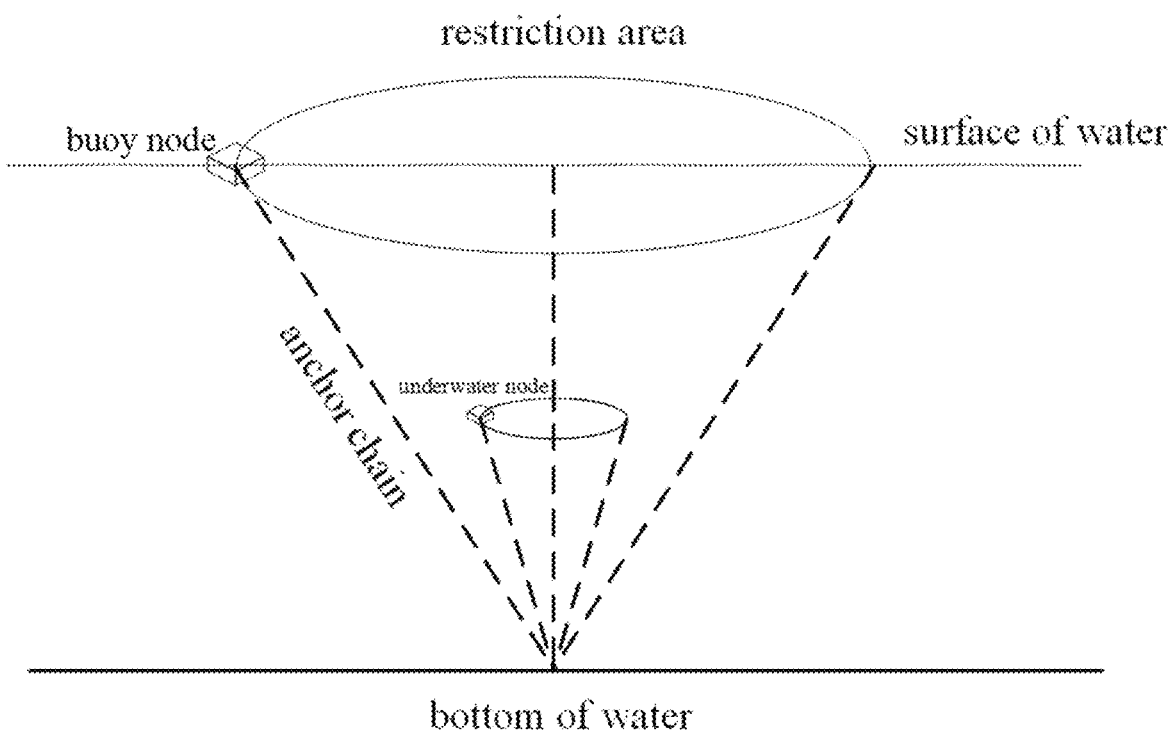
FIG. 3 is a schematic diagram of a motion restriction area for the anchor node.

In this embodiment, the S1 specifically includes:

In underwater target node positioning, the node positioning method based on RSS has attracted wide attention because of its low cost and no need for time synchronization. However, in the underwater environment, due to high dynamic and complexity of the underwater environment, the path loss factor easily changes with the change of environment, which leads to the decline of positioning accuracy. Due to the influence of water flow, the position of the sensor node and the target node of the buoy changes at every moment, and the movement of the buoy is usually restricted by the anchor chain and confined to a circle with a radius of $M=\sqrt{L^2-Dep^2}$, where L is the length of the anchor chain and Dep is the water depth, as shown in FIG. 3. In this part, the received signal strength model is constructed according to the signal propagation loss and the underwater sound propagation absorption effect, and then the optimization function by the joint estimation is constructed according to the model.

Deploying a total of N anchor nodes and a target node in underwater and surface environments, assuming that the position of the $i^{th}$ anchor node at the moment t is $a_i^t=[a_{i1}^t,a_{i2}^t,a_{i3}^t]^T$, T represents a transposition: the position of the target node at the moment t is $x^t=[x_1^t, x_2^t,x_3^t]^T$.

according to a wireless signal loss propagation model, a signal strength of information sent by a node received by node i is expressed as:

$$L_i^t = L_s^t - L(l_0) - 10\beta\log_{10}\frac{\|x^t - a_i^t\|}{l_0} - \alpha_f\|x^t - a_i^t\| + n_i \quad (1)$$

where $L_i^t$, represents a power of a target node received by an $i^{th}$ anchor node at a moment t; $L_s^t$ represents a transmit power of the target node at the moment t; $L(l_0)$ represents a loss value when a reference distance is $l_0$, $l_0$ is usually 1 m; $\beta$ represents the path loss factor: $\|\square\|$ represents a second-order norm; $n_i$ represents a signal attenuation noise of the $i^{th}$ anchor node, it is assumed that the noise variance of each anchor node is equal, if it obeys a Gaussian distribution with a mean of zero and a variance of $\sigma_i^2$, it may be expressed as $n_i \sim G(0,\sigma_i^2)$: $\alpha_f$ represents an absorption coefficient, obtained by using Thorpe formula through the emission frequency f, that is:

$$\alpha_f = 0.11\frac{f^2}{1+f^2} + 44\frac{f^2}{4100+f^2} + 2.75\times 10^{-4}f^2 + 0.003 \quad (2)$$

if the observation vector at the moment t is $L^t=[L_i^t]^T$, and the path loss factor is unknown, its joint probability density function may be expressed as:

$$p(L^t \mid x^t, \beta) = \prod_{i=1}^{N} \frac{1}{\sqrt{2\pi\sigma_i^2}}\exp\left\{\frac{L_i - L_0 + 10\beta\log_{10}\frac{l_i^t}{l_0} + c_i^t}{2\sigma_i^2}\right\} \quad (3)$$

where $l_i^t=\|x^t-a_i^t\|$, $L_0=L_s^t-L(l_0)$, $c_i^t=\alpha_f l_i^t$.

obtaining the ML estimation by maximizing the probability density function, that is $$F(\hat{x}^t, \beta) = \arg\min_{x^t,\beta}\sum_{i=1}^{M}\frac{\left(L_i^t - L_0 + 10\beta\log_{10}\frac{l_i^t}{l_0} + c_i^t\right)}{2\sigma_i^2} \quad (4)$$

The above formula is very difficult to solve due to the unknown path loss factor and the non-convexity of the height.

The S2 specifically includes:

assuming that the noise $n_i$ is small enough, making $l_0=1$ m; obtaining the following approximate expression according to formula (1):

$$l_i^t \approx 10^{\frac{L_0-L_i^t+\alpha_f}{10\beta}}10^{-\frac{\alpha_f l_i^t}{10\beta}} \quad (5)$$

making $\bar{\lambda}=10^{-(\alpha_f l_i^t)/10\beta}$, and it may be proved that when the absorption coefficient $\alpha_f$ is small enough, especially in deep water, the absorption term $$\alpha_f l_i^t \ll \frac{10\beta}{\ln 10},$$

therefore $0 < \|v\| \ll 1$. Therefore, for a small absorption coefficient $\alpha_f$, Taylor first-order expansion may be used to approximate $\lambda$.

$$10^{-\frac{\alpha_f l_i^t}{10\beta}} \approx 1 - \ln 10 \cdot \frac{\alpha_f l_i^t}{10\beta} \quad (6)$$

introducing formula (6) into formula (5), obtaining $$10^{\frac{L_0}{10\beta}} = l_i^t \left( 10^{\frac{l_i^t - \alpha_f}{10\beta}} + 10^{\frac{L_0}{10\beta}} \cdot \ln 10 \cdot \frac{\alpha_f}{10\beta} \right) \quad (7)$$

making $$v = 10^{\frac{L_0}{10\beta}}, \bar{n}_i = 10^{\frac{L_i^t - \alpha_f}{10\beta}},$$

then $$v = l_i^t \left( \bar{n}_i + v \cdot \frac{\ln 10 \alpha_f}{10\beta} \right) \quad (8)$$

obtaining a distance $l_i^t$;

$$l_i^t = \frac{v}{\left( \bar{n}_i + v \cdot \frac{\ln 10 \alpha_f}{10\beta} \right)} \quad (9)$$

transforming formula (9)

$$l_i^t \approx \frac{\frac{10\beta}{\alpha_f \ln 10} \left( \bar{n}_i + v \cdot \frac{\ln 10 \alpha_f}{10\beta} \right) - \frac{10\beta}{\alpha_f \ln 10} \bar{n}_i}{\left( \bar{n}_i + v \cdot \frac{\ln 10 \alpha_f}{10\beta} \right)} \quad (10)$$

rewriting formula (10) as $$l_i^t \approx \frac{10\beta}{\alpha_f \ln 10} - \frac{\frac{10\beta}{\alpha_f \ln 10} \bar{n}_i}{\left( \bar{n}_i + v \cdot \frac{\ln 10 \alpha_f}{10\beta} \right)} \quad (11)$$

making $$\zeta = \frac{\frac{10\beta}{\alpha_f \ln 10} \bar{n}_i}{\left( \bar{n}_i + v \cdot \frac{\ln 10 \alpha_f}{10\beta} \right)},$$

dividing the numerator and the denominator by $\bar{n}_i$, at the same time $$\zeta = \frac{\frac{10\beta}{\alpha_f \ln 10}}{\left( 1 + \frac{v}{\bar{n}_i} \cdot \frac{\ln 10 \alpha_f}{10\beta} \right)} \quad (12)$$

making $$\varsigma = \frac{v_i}{\bar{n}_i} \cdot \frac{\ln 10 \alpha_f}{10\beta}$$

may prove $|\zeta| \ll 1$ in most underwater wireless sensor making network environments. Therefore, when the absorption coefficient $\alpha_f$ is small enough, the first-order Taylor expansion with $\zeta = 0$ may be used to approximate formula (12) as follows:

$$\frac{1}{1 + \frac{v}{\bar{n}_i} \cdot \frac{\ln 10 \alpha_f}{10\beta}} \approx 1 - \frac{v}{\bar{n}_i} \cdot \frac{\ln 10 \alpha_f}{10\beta} \quad (13)$$

introducing formula (13) into formula (11), obtaining $$(l_i^t)^2 \approx \left( \frac{v}{\bar{n}_i} \right)^2 = \left( 10^{\frac{L_0 - L_i^t + \alpha_f}{10\beta}} \right)^2 \quad (14)$$

however, because the path loss factor $\beta$ is unknown, its distance cannot be obtained. Making $$\beta = \tilde{\beta}\left( 1 + \frac{\beta - \tilde{\beta}}{\tilde{\beta}} \right) \text{ and } \vartheta = \frac{\beta - \tilde{\beta}}{\tilde{\beta}}$$

by introducing the estimated parameter $\tilde{\beta}$, where $\tilde{\beta} \neq 0$. And formula (14) may be transformed into $$(l_i^t)^2 \approx 10^{\frac{L_0 - L_i^t + \alpha_f}{5\tilde{\beta}(1+\vartheta)}} \quad (15)$$

assuming that $|\vartheta|$ is relatively small, that is $$\frac{1}{1+\vartheta} \approx 1 - \vartheta,$$

then $$(l_i^t)^2 \approx \mu_i^{1-\vartheta} \quad (16)$$

where $\mu_i = 10^{\frac{L_0 - L_i^t + \alpha_f}{5\tilde{\beta}}}$.

Further approximating formula (16) by performing the first-order Taylor expansion on $\mu_r^{-\vartheta}$ $$(l_i^t)^2 \approx \mu_i (1 - \vartheta \ln \mu_i) \quad (17)$$

therefore, the LS framework of the distance is as follows:

$$\arg\min_{x^t,\vartheta} \sum_{i=1}^{N} [\|x^t - a_i^t\|^2 - (l_i^t)^2]^2 \quad (18)$$

making $\psi=[\|x^t\|^2, (x^t)^T, \vartheta]^T$, expanding the formula (18), and then transforming into the adaptive non-linear sampling (ANLS) problem:

$$F(\psi) = \arg\min_{\psi\ldots 0}\|A\psi - B\|^2 \quad (19)$$

where:

$$A = \begin{bmatrix} 1 & -2(a_1^t) & \mu_1 \ln \mu_1 \\ \vdots & \vdots & \vdots \\ 1 & -2(a_N^t)^T & \mu_N \ln \mu_N \end{bmatrix}^T, B = \begin{bmatrix} \mu_1 - \|a_1^t\|^2 \\ \vdots \\ \mu_N - \|a_N^t\|^2 \end{bmatrix}. \quad (20)$$

The S3 specifically includes:
according to the IPM, introducing the penalty function to re-express the problem (19)

$$\Phi(\psi,\theta) = \min\left(\|A\psi - B\|^2 - \theta\sum_{i=1}^{N}\ln(\psi_i)\right) \quad (21)$$

where $\theta>0$ represents the penalty factor, $\theta$ gradually decreases to zero with an iteration, and the feasible region is D={$\psi_i$>0, i=1, 2, . . . , k}. The first-order gradient and the second-order gradient of formula (21) are respectively $$\nabla\Phi_y(\psi,\theta) = 2A^T(A\psi - B), -\theta_j \cdot Y^{-1} \cdot E, \quad (22)$$

$$\nabla\Phi_{yy}^2(\psi,\theta) = 2A^TA - \theta_k \cdot Y^{-2} \cdot E$$

where $E=[1\ 1\ \ldots\ 1]^T$, $Y=\text{diag}(\psi_1, \psi_2 \ldots \psi_k)$, the problem may be solved by using Newton iteration method to find the optimal solution: making $z_k=(\psi_k)^{-1}$, $Z=\text{diag}(z_1, z_2 \ldots, z_k)$ expressing KKT conditions as:

$$\psi^T(A^TA\psi - A^TB) - z = 0, \quad (23)$$

$$YZE - \theta E = 0$$

writing the KKT conditions in a matrix form:

$$F(\psi, z) = \begin{bmatrix} \psi^T(A^TA\psi - A^TB) - z \\ YZE - \theta E \end{bmatrix} = 0 \quad (24)$$

according to $F(\psi_k, z_k)+F'(\psi_k, z_k)(d_\psi^k, d_z^k)=0$, building a linear system:

$$\begin{bmatrix} \nabla\Phi_{yy}^2(\psi,\theta) & -I \\ Z_k & Y_k \end{bmatrix}\begin{bmatrix} d_k^\psi \\ d_k^z \end{bmatrix} = -\begin{bmatrix} \nabla f(y_k) - z_k \\ Y_k Z_k E - \theta_j E \end{bmatrix}, \quad (25)$$

where $d_k^\psi$ and $d_k^z$ represent Newton iteration directions.

A great advantage of IP-based method is that it does not need a strictly feasible initial point, but only needs non-negative conditions. Once the initial point satisfying the above system is found, a linear search may be conducted along $d_k^\psi$ to find a new iteration value, which follows $\psi_{k+1}=\psi_k+\alpha_k d_k^\psi$, where $\alpha_k$ is the step size. Similarly, $z_{k+1}=z_k+\alpha_k d_k^z$. When tolerances of all conditions are established, a final solution a$\psi$* may be obtained.

The S4 specifically includes:

$$F(\psi) = \arg\min_{\psi\ldots 0}\|\varpi_j(A\psi - B)\|^2 \quad (26)$$

$$\text{s.t.}(\psi)^T D\psi + 2f^T\psi = 0$$

where $$\varpi_i = 1 - l_i^t \Big/ \sum_{i=1}^{N} l_i^t,$$

$$D = \begin{bmatrix} 0 & 0_{1\times 4} & 0 \\ 0 & I_4 & 0 \\ 0 & 0_{1\times 4} & 0 \end{bmatrix},$$

$$f = \begin{bmatrix} -\frac{1}{2} \\ 0_{4\times 1} \end{bmatrix};$$

I and 0 represent respectively an identity matrix and a zero matrix.

Nodes in underwater wireless sensor networks are vulnerable to Byzantine attacks and become fault nodes, which leads to the problem in (26) not being applicable to the actual situation, so a regularization function $h(\overline{\varpi}_i)$ is introduced, that is $$G(\psi,\varpi) = \arg\min_{\psi\ldots 0}\|\varpi_i(A\psi - B)\|^2 + h(\varpi_i) \quad (27)$$

$$\text{s.t.}(\psi)^T D\psi + 2f^t\psi = 0$$

where:

$$h(\varpi_i) = \sum_{i=1}^{N}\delta^2\varpi_i + \frac{2-\rho}{\rho}\varpi_i^{-\frac{\rho}{2-\rho}}. \quad (28)$$

The S5 specifically includes:
transforming the original problem into two sub-problems, that is $$\begin{cases} \psi^{k+1} = \arg\min_\psi G(\psi, \varpi^k) \\ \text{s.t.}(\psi)^T D\psi + 2f^t\psi = 0 \end{cases} \quad (29)$$

$$\begin{cases} \varpi^{k+1} = \arg\min_\varpi G(\psi^{k+1}, \varpi) \\ \text{s.t.}(\psi)^T D\psi + 2f^t\psi = 0 \end{cases}$$

where k represents a number of the iterations.

The second problem in formula (29) is a strictly convex function, so it may be solved according to formula (30) in each iteration $$\varpi_i^k = \left((A\psi - B)^2 + \delta^2\right)^{\frac{p-2}{p}}. \tag{30}$$

The first problem in formula (29) is non-convex, so Lipschitz constant $\lambda$ is introduced to construct BCU equation.

$$\psi^{k+1} = \arg\min_\psi \left\{ \nabla_\psi G\left(\hat{\psi}, \varpi^k\right), \varpi^{k-1}, \psi - \hat{\psi}^k \right\} + \lambda^k \left\|\psi - \hat{\psi}^k\right\|^2 \tag{31}$$

$$\text{s.t.}(\psi)^T D\psi + 2f^t \psi = 0$$

where $$\hat{\psi}^k = \psi^{k-1} + \eta^k\left(\psi^{k-1} - \psi^{k-2}\right) \tag{32}$$

$$\eta^k = \frac{1}{12}\sqrt{\lambda^{k-1}/\lambda^k}$$

is a given extrapolation coefficient, $\lambda^0 = 2\|k^T \overline{\omega} k\|$.

According to the definition of the Lipschitz constant $$\hat{\psi}^k = \psi^{k-1} + \eta^k\left(\psi^{k-1} - \psi^{k-2}\right) \tag{33}$$

literature shows that this method is capable of converging.

According to Theorem 1, the first problem in formula (31) has a global minimum in each iteration. In the process of solving, a multiplier $\wp \in \mathbb{R}$ is introduced, and there is a global minimum when the KKT condition is obeyed $$\left(\lambda^k I_3 + \wp D\right)\psi^k = -\kappa^T \varpi^{k-1}\left(A\hat{\psi}^k - B\right) + \lambda^k \hat{\psi}^k - \wp f, \tag{34}$$

$$(\psi)^T D\psi + 2f^t \psi = 0,$$

$$\wp \ldots \max\left(-l^k, \left(\sqrt{(A^T A)D^2(A^T A)}\right)^{-1}\right)$$

Obtaining the optimal solution by formula (35)

$$\psi(\wp) = \left(\lambda^k I_3 + \wp^* D\right)^{-1} \times \left(-A^T \varpi^{k-1}\left(A\hat{\psi}^k - B\right) + \lambda^k \hat{\psi}^k - \wp^* f\right) \tag{35}$$

where obtaining $\wp$, $\wp *$ by formula (36):

$$\wp^{\text{å}} = \max\left[-\text{diag}(\lambda^k)/\text{diag}(D), \wp\right], \tag{36}$$

$$\psi(\wp)^T D\psi(\wp) + 2f^T \psi(\wp) = 0$$

calculating the precise position coordinate $x^t$ of the marine node and the estimated value $\beta = \hat{\beta}(1+\vartheta)$ of the path loss factor after a variable y is obtained, where $\vartheta$ is the first column of the last row of $\psi$, in order to further optimize the estimated value of the path loss factor, calculating an average value of the path loss factor according to the solved position information, that is:

$$\bar{\beta} = \frac{\sum_{i=1}^N \left(L_0 - L_i - \alpha_f \hat{l}_i^t\right)}{\sum_{i=1}^N \left(10\log_{10} \hat{l}_i^t\right)} \tag{37}$$

where $\hat{l}_i^t$, represents an estimated value of a distance between an estimated position of an unknown node and the anchor node.

Next the problem model established by the application and the node positioning method for MEM-WSNs are simulated and analyzed through MATLAB R2022a, so as to further introduce the implementation of the example of the application and its advantages in the field of marine environmental monitoring. According to different scenarios, compared with the existing methods WLS, SR-LS, SR-IRLS, PM, RNLA, the minimum root mean square error is used as the evaluation index to evaluate the performance of the proposed method, that is $$RMSE_x = \sqrt{\frac{1}{MC}\sum_{i=1}^{MC}(\hat{x} - x)^2}, \tag{38}$$

$$RMSE_\beta = \sqrt{\frac{1}{MC}\sum_{i=1}^{MC}(\hat{\beta} - \beta)^2}$$

where MC is a total number of Monte Carlo experiments, $\hat{x}$ and $\hat{\beta}$ are respectively the estimated values in the $i^{th}$ MC iteration. In order to simulate the highly dynamic of the underwater real environment, the positions of the anchor nodes and the target node are randomly changed in each simulation. The six positioning methods are compared from following three aspects:

1) different anchor node numbers;
2) different deployment ranges;
3) different absorption coefficients.

Figure 4:
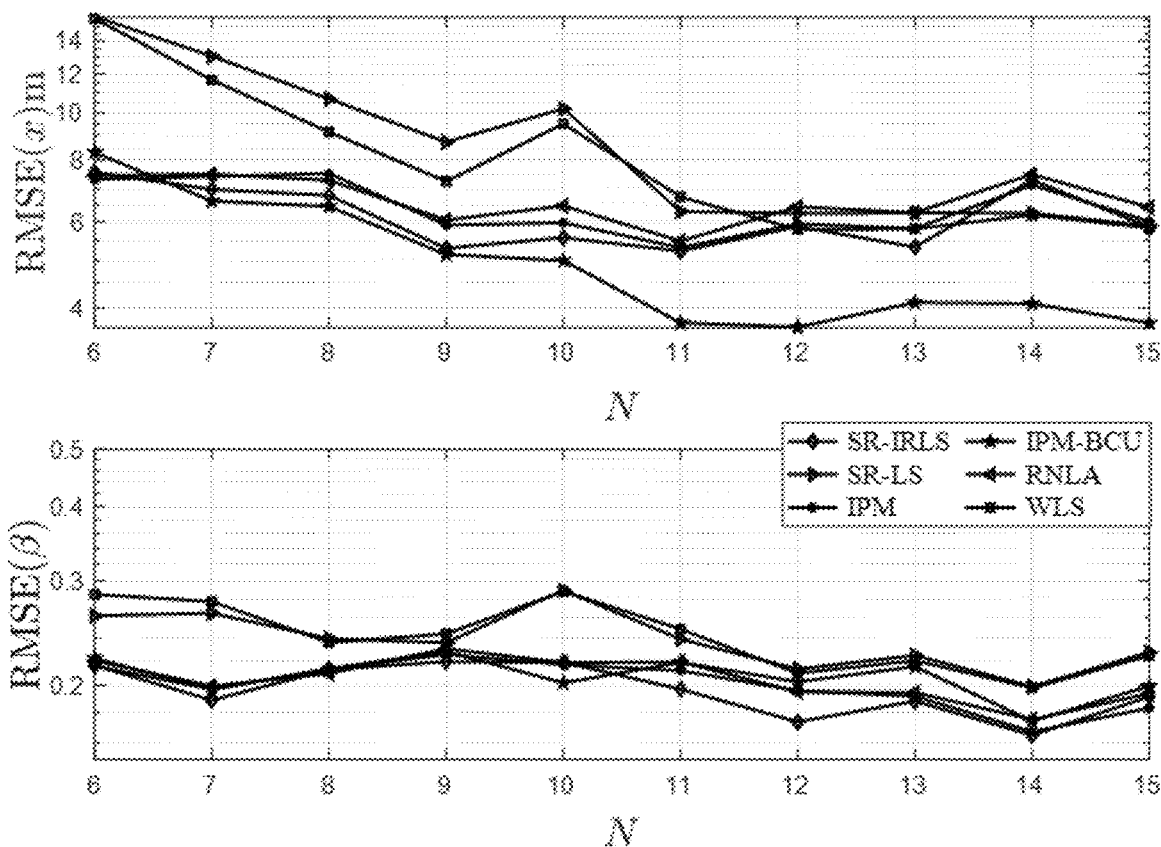
FIG. 4 is a comparison chart showing estimation errors of positions and of path loss factors corresponding to different anchor node numbers.

FIG. 4 shows the estimation errors of the positions and of the path loss factors corresponding to different anchor node numbers. With the increase of the anchor node number, the information of RSS used for estimation increases, so the estimation error of each method decreases with the increase of the anchor node number. As can be seen from the figure, with the increase of the anchor node number, except SR-LS and WLS, the positioning errors of other methods decrease. For IPM-BCU, WLS and SR-LS, they are more sensitive to the change of the anchor node number, in the process of increasing the anchor node number N from 6 to 15, their positioning accuracies increase by nearly 60%, but of IPM-BCU is higher. However, the positioning accuracies of SR-IRLS, IPM and ANLS are improved by 22%, 20% and 14% respectively. When the number of nodes is low, IPM-BCU outperforms SR-LS and WLS and is close to IPM, RNLA and SR-IRLS. For the estimation error of the path loss factor, the estimation errors of IPM-BCU and ANLS are similar and obviously better than that of WLS and SRLS. Therefore, on the whole, the estimation effect of IPM-BCU is obviously better than other methods.

Figure 5:
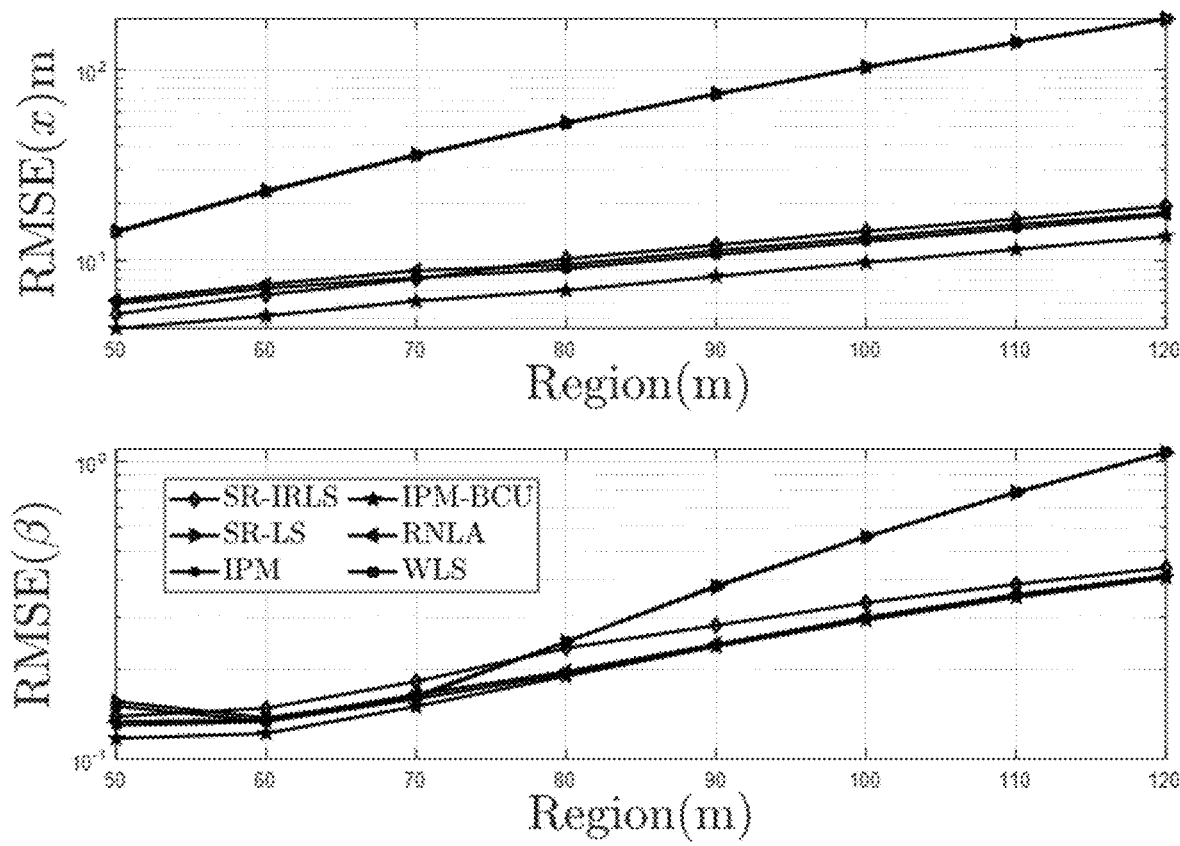
FIG. 5 is a comparison chart showing estimation errors of positions and of path loss factors corresponding to different deployment ranges.

FIG. 5 shows the estimation errors of the positions and of the path loss factors corresponding to different deployment ranges. Due to the increase of deployment range, the influence of absorption effect on positioning accuracy is gradually increasing, and the position estimation errors of each method are increasing. In the process of increasing the side length of the deployment area from 50 m to 120 m, the estimation errors of SR-LS, WLS, IPM-BCU, IPM, RNLA and SR-IRLS increase by 500%, 500%, 216%, 202%, 200% and 147% respectively. Compared with other positioning methods, the positioning accuracies are still improved by 10%-25%. Although the error increase ratio of IPM-BCU is large, it may be seen from the figure that the error of IPM-BCU is still the smallest. For the estimation error of the path loss factor, when the side length of the deployment area is 60 m, the estimation error of SRLS and WLS decrease, but with the increase of the deployment area, the overall error trend still increases. The final results show that the IPM-BCU method has higher estimation accuracy for the position and the path loss factor, and has greater advantages compared with other methods.

Figure 6:
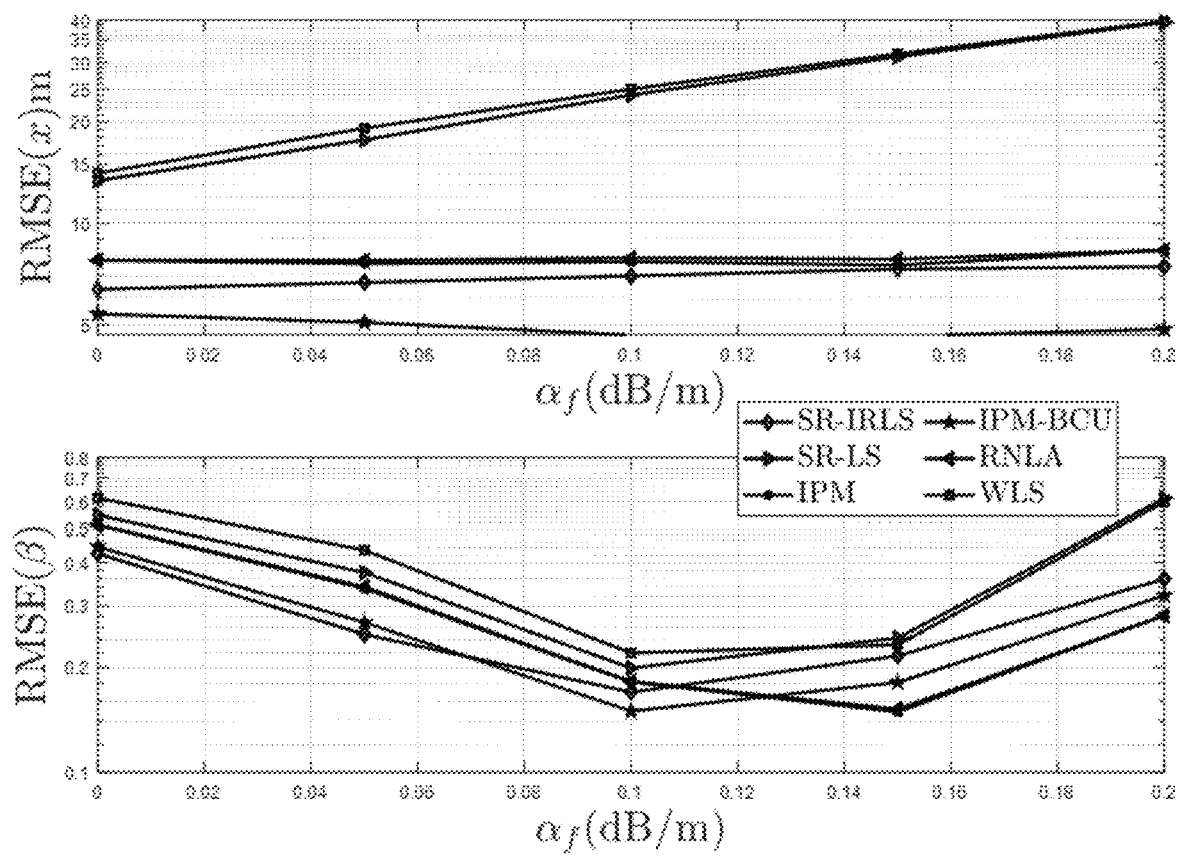
FIG. 6 is a comparison chart showing estimation errors of positions and of path loss factors corresponding to different absorption coefficients.

FIG. 6 shows the estimation errors of the positions and the path loss factors corresponding to different absorption coefficients. As can be seen from the figure, the position estimation errors of WLS and SRLS increase with the increase of the absorption coefficient, and the growth ratio reaches 178% and 190% respectively. The other methods are relatively stable, and the fluctuation range of position error is less than 10%, showing a strong robustness. At the same time, it is found that the proposed positioning method is the best for estimating the target position and the closest positioning scheme to CRLB. For a single IPM method, its performance is at a medium level. In the estimation of the path loss factor, when $\alpha_f=[0,0.12]$, the estimation accuracy of IPM-BCU is higher than all methods except SR-IRLS, and when $\alpha_f=[0.08,0.12]$, the performance of IPM-BCU is the best. When $\alpha_f=[0.12,0.2]$, the performance of IPM-BCU is still better than other methods except IPM and RNLA. As can be seen from the figure, the robustness of each method is not ideal for estimating the path loss factor, but the proposed method still maintains a high performance.

To sum up, the node positioning method for MEM-WSNs provided by the application realizes a positioning with high-precision and high-robustness for the marine target nodes, and has the best performance compared with the 40 existing positioning methods in different scenarios.

The preferred embodiments of the present application have been described in detail above. It should be understood that those skilled in the art can make many modifications and changes according to the concept of the present application without creative work. Therefore, any technical scheme that may be obtained by a person skilled in the technical field through logical analysis, reasoning or limited experiments on the basis of the existing technology according to the concept of the present application should be within the protection scope determined by the claims.

What is claimed is:

1. A node positioning method for marine environmental monitoring wireless sensor networks comprising:
   establishing a received signal strength model according to a signal propagation loss and an underwater sound propagation absorption effect;
   establishing an optimization function by a joint estimation of a path loss factor and a target position;
   re-expressing the optimization function by using a penalty function, and finding an approximate solution of position coordinates of marine nodes by using an interior point method; and
   transforming an original positioning problem into a generalized trust region sub-problem, using the approximate solution of the interior point method as an initial estimated value of the generalized trust region sub-problem, and finding an optimal solution by combining a block coordinate update.

2. The node positioning method for marine environmental monitoring wireless sensor networks according to claim 1, wherein establishing the received signal strength model comprises:
   according to a wireless signal loss propagation model, expressing a signal strength of information sent by a node received by node i as:

$$L_i^t = L_s^t - L(d_0) - 10\beta \log_{10} \frac{\|x^t - a_i^t\|}{l_0} - \alpha_f \|x^t - a_i^t\| + n_i$$

wherein $L_i^t$, represents a power of a target node received by an $i^{th}$ anchor node at a moment t; $L_s^t$, represents a transmit power of the target node at the moment t; $L(l_0)$ represents a loss value when a reference distance is $l_0$; $\beta$ represents the path loss factor; $\|\square\|$ represents a second-order norm; $n_i$ represents a signal attenuation noise of the $i^{th}$ anchor node; $\alpha_f$ represents an absorption coefficient; $a_i^t$ represents a position of the $i^{th}$ anchor node at the moment t; and $x^t$ represents a position of the target node at the moment t.

3. The node positioning method for marine environmental monitoring wireless sensor networks according to claim 1, wherein the joint estimation of the path loss factor and the target position is as follows:

$$F(\hat{x}^t, \beta) = \arg\min_{x^t, \beta} \sum_{i=1}^{M} \frac{\left(L_i^t - L_0 + 10\beta \log_{10} \frac{l_i^t}{l_0} + c_i^t\right)}{2\sigma_i^2}$$

wherein $x^t$ represents the position of a target node at a moment t; $\beta$ represents the path loss factor; $L_i^t$ represents a power of the target node received by an $i^{th}$ anchor node at the moment t; $L_0 = L_s^t - L(l_0)$; $L(l_0)$ represents a loss value when a reference distance is $l_0$; $l_i^t = \|x^t - a_i^t\|$; $c_i^t = \alpha_f l_i^t$; and $a_i^t$ represents the position of the $i^{th}$ anchor node at the moment t and $\alpha_f$ represents an absorption coefficient.

4. The node positioning method for marine environmental monitoring wireless sensor networks according to claim 3, wherein the optimization function by the joint estimation of the path loss factor and the target position is expressed as a problem of adaptive non-linear sampling (ANLS):

$$F(\psi) = \operatorname*{argmin}_{\psi \ldots 0} \|A\psi - B\|^2$$

wherein $$A = \begin{bmatrix} 1 & -2(a_1^t)^T & \mu_1 \ln \mu_1 \\ \vdots & \vdots & \vdots \\ 2 & -2(a_N^t)^T & \mu_N \ln \mu_N \end{bmatrix}^T,$$

$$B = \begin{bmatrix} \mu_1 - \|a_1^t\|^2 \\ \vdots \\ \mu_N - \|a_N^t\|^2 \end{bmatrix};$$

$$\psi = \left[\|x^t\|^2, (x^t)^T, \vartheta\right]^T; a_i^t$$

represents the position of the $i^{th}$ anchor node at the moment t; $x^t$ represents the position of the target node at the moment t;

$$\vartheta = \frac{\beta - \tilde{\beta}}{\tilde{\beta}};$$

$\beta$ represents the path loss factor; $\tilde{\beta}$ represents an estimated parameter;

$$\beta = \tilde{\beta}\left(1 + \frac{\beta - \tilde{\beta}}{\tilde{\beta}}\right); \text{ and } \mu_i = 10^{(L_0 - L_i^t + \alpha_f)/5\beta}.$$

5. The node positioning method for marine environmental monitoring wireless sensor networks according to claim 4, wherein re-expressing the optimization function by using the penalty function and finding the approximate solution by using the interior point method comprise:

introducing the penalty function to re-describe the problem according to the interior point method:

$$\Phi(\psi, \theta) = \min\left(\|A\psi - B\|^2 - \theta \sum_{i=1}^{N} \ln(\psi_i)\right)$$

wherein $\theta > 0$ represents a penalty factor, $\theta$ gradually decreases to zero with iterations, and a feasible region is $D = \{\psi_i > 0, i = 1, 2, \ldots, k\}$; and solving Karush-Kuhn-Tucker (KKT) by using a Newton iteration method to find an optimal solution of the problem.

6. The node positioning method for marine environmental monitoring wireless sensor networks according to claim 5, wherein solving KKT by using the Newton iteration method to find the optimal solution of the problem comprises:

making $z_k = (\psi_k)^{-1}$, $Z = \text{diag}(z_1, z_2, \ldots, z_k)$, then expressing KKT conditions as:

$$\psi^T(A^T A\psi - A^T B) - z = 0,$$

$$YZE - \theta E = 0$$

writing the KKT conditions in a matrix form:

$$F(\psi, z) = \begin{bmatrix} \psi^T(A^T A\psi - A^T B) - z \\ YZE - \theta E \end{bmatrix} = 0$$

according to $F(\psi_k, z_k) + F'(\psi_k, z_k)(d_\psi^k, d_z^k) = 0$, building a linear system:

$$\begin{bmatrix} \nabla \Phi_{yy}^2(\psi, \theta) & -I \\ Z_k & Y_k \end{bmatrix} \begin{bmatrix} d_k^\psi \\ d_k^z \end{bmatrix} = -\begin{bmatrix} \nabla f(y_k) - z_k \\ Y_k Z_k E - \theta_j E \end{bmatrix},$$

wherein $d_k^\psi$ and $d_k^z$ represent Newton iteration directions; and finding an initial point that satisfying the linear system, and searching linearly along $d_k^\psi$ and $d_k^z$ respectively to find new iterative values; wherein when tolerances of all conditions are established, a final solution $\psi^*$ is obtained.

7. The node positioning method for marine environmental monitoring wireless sensor networks according to claim 4, wherein transforming the original positioning problem into the generalized trust region sub-problem comprises:

$$F(\psi) = \text{argmin}_{\psi,\ldots 0} \|\varpi_i(A\psi - B)\|^2$$

$$\text{s.t. } (\psi)^T D\psi + 2f^T\psi = 0$$

wherein $\varpi_i = 1 - l_i^t / \sum_{i=1}^{N} l_i^t$, $D = \begin{bmatrix} 0 & 0_{1\times 4} & 0 \\ 0 & I_4 & 0 \\ 0 & 0_{1\times 4} & 0 \end{bmatrix}$, $f = \begin{bmatrix} -\frac{1}{2} \\ 0_{4\times 1} \end{bmatrix}$;

I and 0 represent respectively an identity matrix and a zero matrix; and introducing a regularization function $h(\overline{\varpi}_i)$:

$$G(\psi, \varpi) = \text{argmin}_{\psi,\ldots 0} \|\varpi_i(A\psi - B)\|^2 + h(\varpi_i)$$

$$\text{s.t. } (\psi)^T D\psi + 2f^T\psi = 0$$

$$h(\varpi_i) = \sum_{i=1}^{N} \delta^2 \varpi_i + \frac{2-\rho}{\rho} \varpi_i^{-\frac{\rho}{2-\rho}}.$$

8. The node positioning method for marine environmental monitoring wireless sensor networks according to claim 5, wherein transforming the original positioning problem into two sub-problems comprises:

$$\begin{cases} \psi^{k+1} = \underset{\psi}{\text{argmin}} G(\psi, \varpi^k) \\ \text{s.t. } (\psi)^T D\psi + 2f^t\psi = 0 \end{cases}$$

$$\begin{cases} \varpi^{k+1} = \underset{\varpi}{\text{argmin}} G(\psi^{k+1}, \varpi) \\ \text{s.t. } (\psi)^T D\psi + 2f^t\psi = 0 \end{cases}$$

wherein k represents a number of the iterations;

a first sub-problem is a non-convex function, solved by constructing a block coordinate updating equation based on Lipschitz constant; and a second sub-problem is a strictly convex function, solved in each iteration according to a following formula:

$$\varpi_i^k = (A\psi - B)^2 + \delta^2)^{\frac{\rho-2}{\rho}}.$$

9. The node positioning method for marine environmental monitoring wireless sensor networks according to claim 8, wherein solving the first sub-problem by constructing the block coordinate updating equation based on Lipschitz constant comprises:

$$\psi^{k+1} = \text{argmin}_\psi \{\nabla_\psi G(\hat{\psi}, \varpi^k), \varpi^{k-1}, \psi - \hat{\psi}^k\} + \lambda^k \|\psi - \hat{\psi}^k\|^2$$

$$\text{s.t. } (\psi)^T D\psi + 2f^t\psi = 0$$

wherein $\hat{\psi}^k = \psi^{k-1} + \eta^k(\psi^{k-1} - \psi^{k-2})$, $\eta^k = \frac{1}{12}\sqrt{\lambda^{k-1}/\lambda^k}$ is a given extrapolation coefficient, $\lambda^0 = 2\|k^T \overline{\omega}k\|$;

introducing a multiplier $\wp \in \square$, wherein a global minimum is obtained when a KKT condition is obeyed;

$$(\lambda^k I_3 + \wp D)\psi^k = -\kappa^T \varpi^{k-1}\left(A\hat{\psi}^k - B\right) + \lambda^k \hat{\psi}^k - \wp f,$$

$$(\psi)^T D\psi + 2f^t\psi = 0,$$

$$\wp \ldots \max\left(-l^k, \left(\sqrt{(A^T A)D^2(A^T A)}\right)^{-1}\right)$$

obtaining the optimal solution by;

$$\psi(\wp) = (\lambda^k I_3 + \wp^* D)^{-1} \times \left(-A^T \varpi^{k-1}\left(A\hat{\psi}^k - B\right) + \lambda^k \hat{\psi}^k - \wp^* f\right)$$

wherein $\wp$, $\wp^*$ are obtained by following formulas:

$$\wp^{\overset{\circ}{a}} = \max\left[-\text{diag}(\lambda^k)/\text{diag}(D), \wp\right], \text{ and}$$

$$\psi(\wp)^T D\psi(\wp) + 2f^T \psi(\wp) = 0$$

calculating a precise position coordinate $x^t$ of a marine node and an estimated value $\beta = \tilde{\beta}(1+\vartheta)$ of the path loss factor after a variable $\psi$ is obtained, wherein $\vartheta$ is a first column of a last row of $\psi$.

10. The node positioning method for marine environmental monitoring wireless sensor networks according to claim 9, wherein in order to further optimize the estimated value of the path loss factor, an average value of the path loss factor is calculated according to solved position information:

$$\overline{\beta} = \frac{\sum_{i=1}^{N}\left(L_0 - L_i - \alpha_f \hat{l}_i^t\right)}{\sum_{i=1}^{N}\left(10\log_{10}\hat{l}_i^t\right)}$$

wherein $\hat{l}^t$ represents an estimated value of a distance between an estimated position of an unknown node and the anchor node.

* * * * *